United States Patent
Littlejohn et al.

(10) Patent No.: US 6,917,847 B2
(45) Date of Patent: Jul. 12, 2005

(54) METHOD AND APPARATUS FOR DESIGN FOR MANUFACTURING

(75) Inventors: Dan Littlejohn, Austin, TX (US); Brent A. Bohmont, New Braunfels, TX (US)

(73) Assignee: Motorola, Inc., Schaumburg, IL (US)

( * ) Notice: Subject to any disclaimer, the term of this patent is extended or adjusted under 35 U.S.C. 154(b) by 60 days.

(21) Appl. No.: 10/622,521

(22) Filed: Jul. 18, 2003

(65) Prior Publication Data

US 2005/0015169 A1 Jan. 20, 2005

(51) Int. Cl.[7] .............................................. G06F 19/00
(52) U.S. Cl. ....................................... 700/108; 700/97
(58) Field of Search .............................. 700/30, 80, 95, 700/96, 97, 108, 182

(56) References Cited

U.S. PATENT DOCUMENTS 6,223,092 B1 * 4/2001 Miyakawa et al. ........... 700/97
6,760,640 B2 * 7/2004 Suttile et al. ................ 700/97

FOREIGN PATENT DOCUMENTS

WO  WO 03/017179 A1  2/2003

* cited by examiner

Primary Examiner—Leo Picard
Assistant Examiner—Charles Kasenge
(74) Attorney, Agent, or Firm—Brian M. Mancini; Kevin Wills

(57) ABSTRACT

A method and apparatus for design for manufacturing includes importing real-time manufacturing data (106) for a first product (110) into a design-for-manufacturing software module (102), importing design data (108) for a second product (112) into the design-for-manufacturing software module (102). Design-for-manufacturing software module (102) compares the real-time manufacturing data to the design data and flags an overlapping element (114) of the real-time manufacturing data and the design data, wherein the overlapping element meets a variance criteria (116).

20 Claims, 3 Drawing Sheets

METHOD AND APPARATUS FOR DESIGN FOR MANUFACTURING

BACKGROUND OF THE INVENTION

In product development cycles, one or more common parts are often incorporated into both a product currently in production and a similar product currently in the design phase. It is desirable to have feedback from the manufacturing process of the product in production so that the product in the design phase can be improved before reaching production. In prior art systems, feedback from manufacturing often passes through a human component, which can slow the feedback process and introduce errors. Also, in prior art systems, there is no means of gathering manufacturing data and in real-time comparing the real-time manufacturing data to design data such that potential flaws in the design or undesirable parts are flagged so that appropriate remedial design corrections can be made.

Prior art software packages such that put forth by "Valor" of Yale, Israel, integrate design information to expedite design reviews. However, these prior art software packages cannot import real-time manufacturing data from a product in production, compare to design information to spot potential future manufacturing problems, flag these potential design problems so that they can be corrected and notify the appropriate design personnel.

Accordingly, there is a significant need for an apparatus and method that improves the design for manufacturing process.

BRIEF DESCRIPTION OF THE DRAWINGS

Referring to the drawing.

Figure 1:
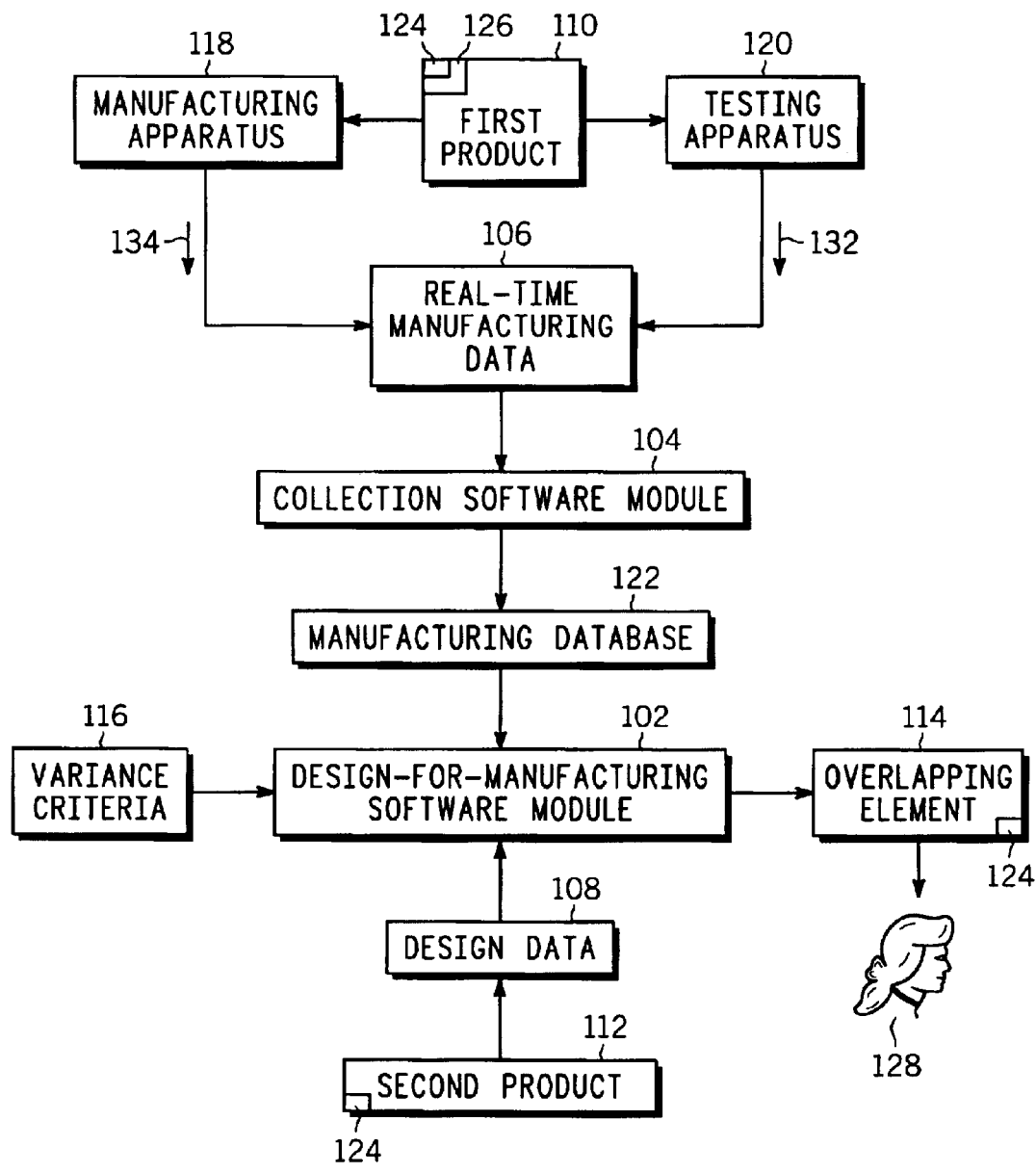
FIG. 1 depicts a block diagram of a design-for-manufacturing system.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical, electrical, or logical contact. However, "coupled" may mean that two or more elements are not in direct contact with each other, but yet still co-operate or interact with each other.

The terms "computer program" and "software," as used herein, are to be interpreted broadly as any computer-readable memory device holding one or more executable processes. These processes are intended to be executed by a processor in a manner consistent with the present invention. Also, the present invention can refer to various processes as interacting with humans or other processes. Those skilled in the art will recognize that human interaction with any of the foregoing processes may be accomplished, for example, using a graphical user interface system to display relevant data and to permit users to exchange commands and data with the associated process.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a block diagram of a design-for-manufacturing system 100. In system form, the present invention is directed at a design-for-manufacturing system 100 comprising a collection software module collecting real-time manufacturing data for a first product, a design-for-manufacturing software module for importing design data for a second product and importing the real-time manufacturing data, where the design-for-manufacturing software module compares the real-time manufacturing data with the design data and flags any overlapping elements that meet a variance criteria.

As shown in FIG. 1, design-for-manufacturing system 100 can include collection software module 104 and a design-for-manufacturing software module 102. In an embodiment, collection software module can collect real-time manufacturing data 106 for first product 110. First product 110 can be, for example and without limitation, an integrated circuit, printed circuit board (PCB), electronic device, mechanical apparatus, and the like. First product can be made up of individual parts, for example a first product part 126. Each of first product parts 126 can have an identification tag 124 associated with it. For example, first product part 126 can have an identification tag 124 associated with it where the identification tag 124 is unique for first product part 126. In an embodiment, identification tag can be a part number, bar code, UP label, and the like. In the present invention, any identification means can be an identification tag 124.

In the system of the present invention, first product 110 can be manufactured using any number of manufacturing apparatus 118. For example and without limitation, manufacturing apparatus 118 can include any machine, algorithm, apparatus, and the like that assembles, secures, monitors, and the like, first product 110 by placing, securing, connecting, coupling, and the like, one or more of first product parts 126 to assemble first product 110. Manufacturing apparatus 118 can also be used to assembly numerous sub-assemblies made up of one or more first product parts 126. In another embodiment, manufacturing apparatus 118 can assemble any number of sub-assemblies, which can be considered first product parts 126 as the sub-assemblies can have their own identification tag 124.

In another embodiment, first product 110 can be tested during or after manufacturing using one or more testing apparatus 120. For example and without limitation, testing apparatus 120 can include any machine, algorithm, apparatus, and the like that tests first product 110 and/or first product part 126 during or after manufacture. In another embodiment, one or more sub-assemblies that include one or more first product parts 126 can be tested where each sub-assembly can be considered a first product part 126 as it can have it's own identification tag 124. First product part 126 can be tested, for example, for operational integrity, electrical and/or mechanical continuity, and the like.

In an embodiment of the present invention, collection software module 104 can collect real-time manufacturing data 106 for first product 110. Real-time manufacturing data 106 can be any data regarding first product 110 and/or first product part 126 collected while manufacturing apparatus 118 or testing apparatus 120 is operating as first product 110 is being manufactured and/or tested. Real-time manufacturing data 106 can comprise, for example and without limitation, first product part rejection data 134 from manufacturing apparatus 118. First product part rejection data 134 can include the identification tag 124 corresponding to first product part 126 that has been rejected, placed in first product 110, and the like. Real-time manufacturing data 106 can include the number of first parts 126 assembled into first product 110, the number of first product parts 126 rejected during manufacture of first product 110, and the like. Any statistical data regarding the manufacture of first product 110 and/or first product part 126 obtained through real-time monitoring of manufacturing apparatus 118 is within the scope of real-time manufacturing data 106.

In another example of an embodiment of the invention, real-time manufacturing data 106 can comprise testing data 132 from testing apparatus 120. Testing data 132 can include the identification tag 124 of first product part 126 that undergoes testing in testing apparatus 120. Testing data 132 can include any statistical data regarding first product 110 or first product part 126. For example, testing data 132 can include identification tag 124 of first product part 126 and the result of the testing of first product part 126. In an exemplary embodiment, first product part 126 can be a printed circuit board or a resistor or other electronic component on a printed circuit board that is tested in testing apparatus 120. The identification tag 124 of the circuit board or particular portion of the circuit board along with the results of testing can be included in testing data. For example, if first product part 126 does not pass testing in testing apparatus 120, first product part 126 might be rejected. The identification tag 124 of first product part 126 can then be part of testing data 132. The invention is not limited by the exemplary embodiments described, and it is understood by one of ordinary skill in the art that other types of testing data 132 are included within the scope of the invention.

Collection software module 104 that collects real-time manufacturing data 106 can be comprised of hardware, software, firmware, and the like to collect real-time-manufacturing data 106. This can include a processor, memory, computer-readable medium, and the like necessary to collect real-time manufacturing data 106. Although not limiting, an exemplary embodiment of collection software module can include Motorola Pulse software manufacturing by Motorola, 21440 West Lake Cook Road, Deer Park, Ill., 60010. Collection software module 104 can include equipment that combines real-time, shop-floor information taken directly from manufacturing apparatus 118 and/or testing apparatus 120 with alarm management tools for utilization, attrition monitoring and Statistical Process Control (SPEC). Other exemplary embodiments of intermediate vendor-specific data collections systems may be present to facilitate data collection. For example, the Agilely Intelligent Test Framework tool made by Agilely Technologies collects data from Agilely In-circuit Test (ICT), Automated Optical Inspection (AOI) and Automated X-Ray Inspection (AXI) equipment and exports this data using an XML interface to Manufacturing Pulse.

In an embodiment, real-time manufacturing data 106 can be imported directly to design-for-manufacturing software module 102. In another embodiment, real-time manufacturing data 106 can be stored in manufacturing database 122. Collection software module 104 can store real-time-manufacturing data 106 in manufacturing database 122 using a logical relational database format. This has the advantage of storing real-time-manufacturing data 106 in a collection of tables related to each other through common values such that real-time manufacturing data 106 can be easily queried, sorted, and the like by other software modules, for example, design-for-manufacturing software module 102.

In an embodiment, second product 112 can include a product that has some commonality with first product 110. For example, second product 112 can be a product that is an incremental improvement over first product 112. Second product 112 can be a next-generation of product that is in the design stage while the related first product 110 is in the manufacturing stage. Second product 112 can include in its design a first product part 126 designated by identification tag 124. In other words, second product 112 in its design stage, can include any number of first product parts 126 that are used in first product 110 in a manufacturing stage as designated by identification tag 124.

Design data 108 can include any design information on second product 112. For example and without limitation, design data 108 can include specifications, schematics, board layouts, part lists, and the like for second product 112. Design data 108 can be in any format, for example, Mentor, Cadence, Gerber, XML, AutoCAD, and the like. Design data 108 can include electrical data, mechanical data, physical data, chemical data, software data, and the like, such that design data includes identification tags 124 to relate design data 108 to any of first product parts 126 in first product 110.

Design-for-manufacturing software module 102 can provide dialog between design and manufacturing environments. Design-for-manufacturing software module 102 can be comprised of hardware, software, firmware, and the like to import real-time-manufacturing data 106 and design data 108. This can include a processor, memory, computer-readable medium, and the like necessary to import real-time manufacturing data 106 and design data 108.

In an embodiment, design-for-manufacturing software module 102 can compare real-time manufacturing data 106 with design data 108 and flag any number of overlapping elements 114 where an overlapping element 114 meets a variance criteria 116. Overlapping elements 114 can include any electrical, mechanical, physical elements, and the like that first product 110 and second product 112 have in common such that these overlapping elements 114 can be designated using identification tag 124. In other words, overlapping element 114 can comprise an identification tag 124 of a first product part 126, where the first product part 126 is incorporated into first product 110 and where identification tag 124 is present in design data 108 for second product 112.

Variance criteria 116 can include any threshold value for first product part 126 as designated by identification tag 124 such that if first product part 126 does not meet the threshold value of variance criteria 116, first product part 126 can be substandard or an item of concern for second product 112 in its design stage. In other words, if first product part 126 does not meet a given standard as set out in variance criteria 116, first product part 126 via it's identification tag 124 can be considered an overlapping element 114 and therefore identified by design-for-manufacturing software module 102.

As an example, real-time manufacturing data 106 can include first product part rejection data 134 such that first product part 126 is rejected by manufacturing apparatus 118 in an amount that exceeds variance criteria 116. If identification tag 124 of first product part 126 is found in design data 108, then design-for-manufacturing software module 102 can flag identification tag 124 corresponding to first product part 126 as an overlapping element 114. In an embodiment, design-for-manufacturing software module 102 can output overlapping element to a user 128 in any of an electronic format, written format, and the like. In one embodiment, user 128 can be any appropriate design person, software, organization, and the like, that can expeditiously implement corrective measures to design data 108 of second product 112. Corrective measures can include eliminating first product part 126 from second product, correcting any manufacturing processes related to first product part 126, and the like.

Figure 2:
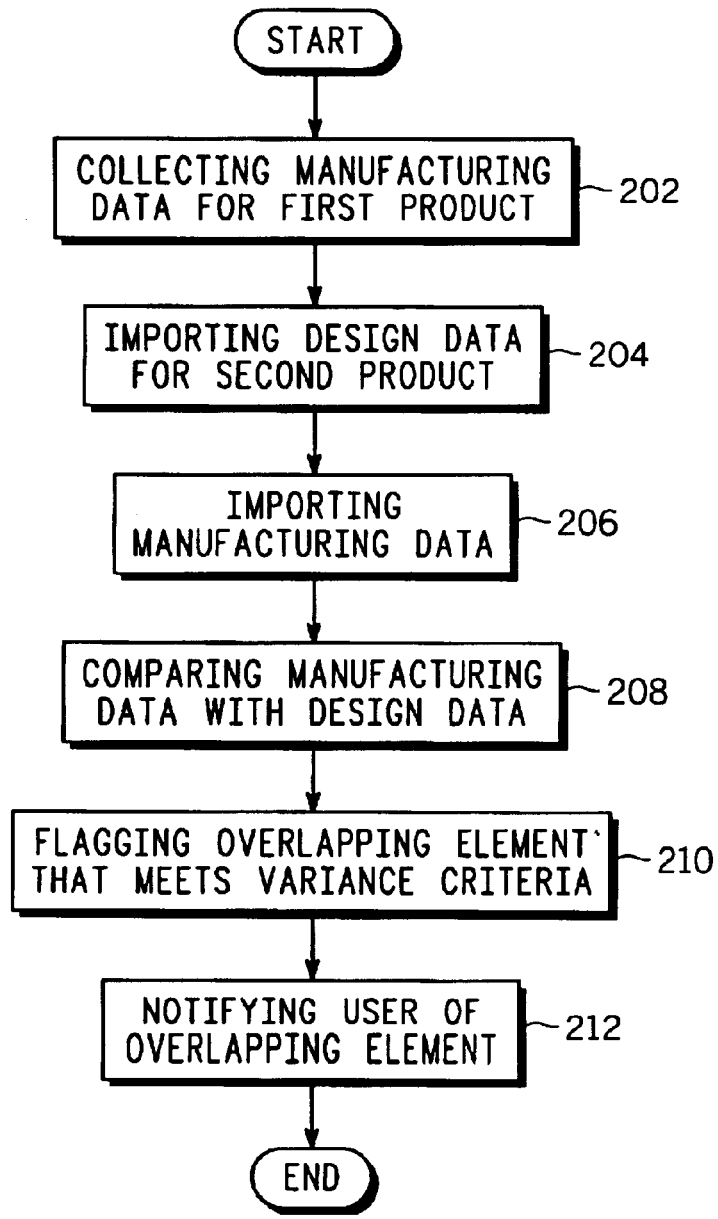
FIG. 2 illustrates a flow diagram of a method of the invention according to an embodiment of the invention.

FIG. 2 illustrates a flow diagram 200 of a method of the invention according to an embodiment of the invention. In step 202, collection software module 104 collects real-time manufacturing data 106 for a first product 110. In step 204, design-for-manufacturing software module 102 imports design data 108 for a second product 112. In step 206, design-for-manufacturing software module 102 imports real-time manufacturing data 106.

In step 208, design-for-manufacturing software module 102 compares real-time manufacturing data 106 to design data 108. In step 210, design-for-manufacturing software module 102 flags an overlapping element 114 of real-time manufacturing data 106 and design data 108 where overlapping element 114 meets a variance criteria 116. In step 212, design-for-manufacturing software module 102 notifies a user 128 of the overlapping element 114.

Figure 3:
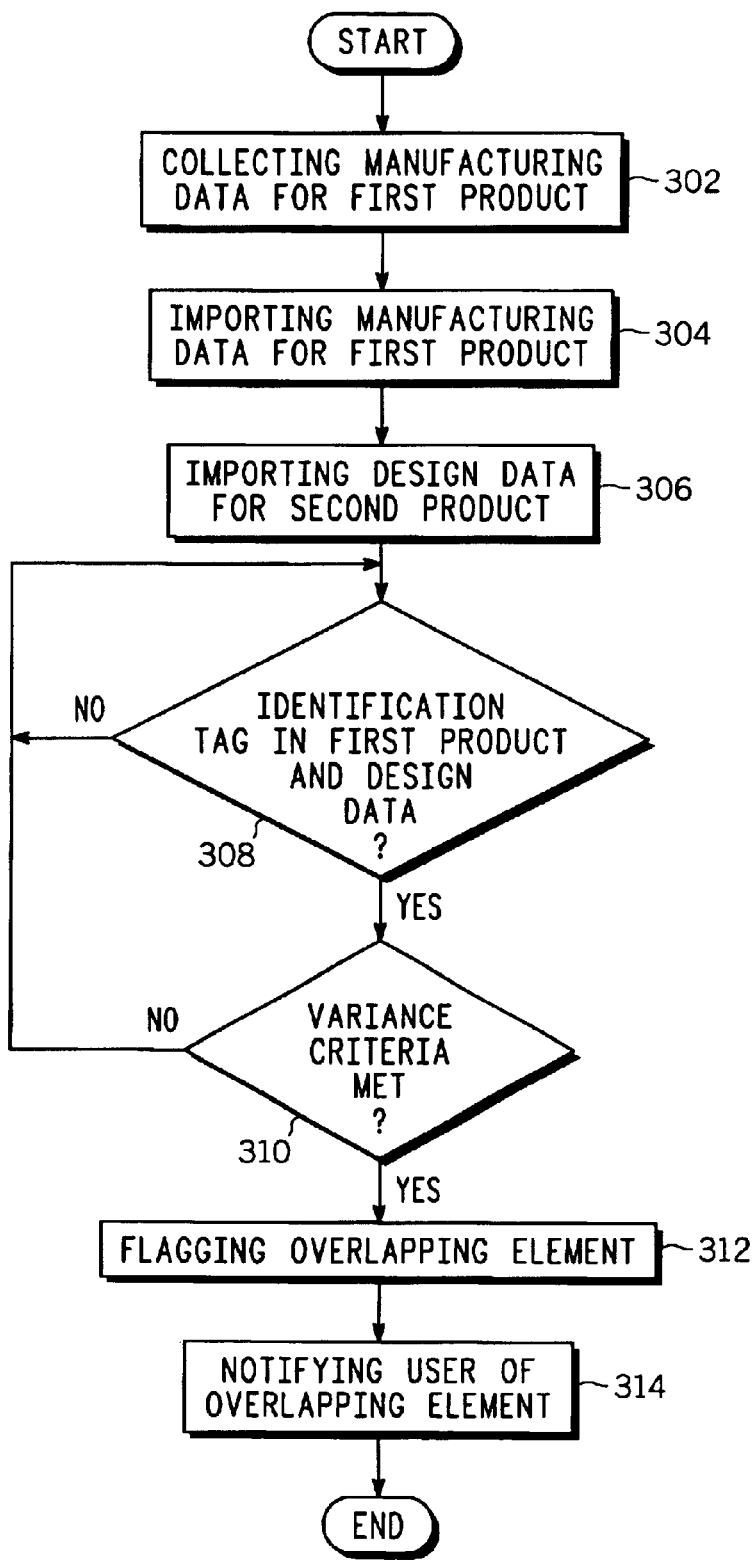
FIG. 3 illustrates a flow diagram of a method of the invention according to another embodiment of the invention.

FIG. 3 illustrates a flow diagram 300 of a method of the invention according to another embodiment of the invention. In step 302, a collection software module 104 collects real-time manufacturing data 106 for a first product 110. In step 304, design-for-manufacturing software module 102 imports design data 108 for a second product 112. In step 306, design-for-manufacturing software module 102 imports the real-time manufacturing data 106.

In step 308 it is determined by design-for-manufacturing software module 102 if identification tag 124 is present in first product 110 via real-time manufacturing data 106, and present in design data 108. If so, in step 310 it is determined if variance criteria 116 is met for first product part 126 corresponding to identification tag 124. If so, design-for-manufacturing software module 102 flags overlapping element 114. In step 312, design-for-manufacturing software module 102 notifies a user 128 of overlapping element 114.

The method and apparatus of the invention offer the advantage of being able to import real-time manufacturing data from a first product that is in production and design data from a second product in a design phase, compare the two sets of data, and flag overlapping elements found in both the first product and the second product that do meet a variance criteria. This had the advantage of reducing the cost and cycle time of spotting manufacturing problems and being able to feed these problems back to the design of a related product.

While we have shown and described specific embodiments of the present invention, further modifications and improvements will occur to those skilled in the art. It is therefore to be understood that appended claims are intended to cover all such modifications and changes as fall within the true spirit and scope of the invention.

What is claimed is:

1. A method, comprising:
    a collection software module collecting real-time manufacturing data for a first product;
    a design-for-manufacturing software module importing design data for a second product; the design-for-manufacturing software module importing the real-time manufacturing data;
    the design-for-manufacturing software module comparing the real-time manufacturing data with the design data; and
    the design-for-manufacturing software module flagging an overlapping element of the real-time manufacturing data and the design data, wherein the overlapping element meets a variance criteria, wherein the overlapping element comprises an identification tag of a first product part, wherein the first product part is incorporated into the first product, and wherein the identification tag of the first product part is present in the design data for the second product.

2. The method of claim 1, further comprising notifying a user of the overlapping element.

3. The method of claim 1, wherein the real-time manufacturing data comprises testing data of first product.

4. The method of claim 1, wherein the real-time manufacturing data comprises first product part rejection data.

5. The method of claim 1, further comprising storing the real-time manufacturing data in a manufacturing database.

6. A design-for-manufacturing system, comprising:
    a collection software module, wherein the collection software module collects real-time manufacturing data for a first product; and
    a design-for-manufacturing software module, wherein the design-for-manufacturing software module imports the real-time manufacturing data, wherein the design-for-manufacturing software module imports design data for a second product, wherein the design-for-manufacturing software module compares the real-time manufacturing data to the design data, wherein the design-for-manufacturing software module flags an overlapping element of the real-time manufacturing data and the design data, and wherein the overlapping element meets a variance criteria, and wherein the overlapping element comprises an identification tag of a first product part, wherein the first product part is incorporated into the first product, and wherein the identification tag of the first product part is present in the design data for the second product.

7. The system of claim 6, wherein a user is notified of the overlapping element.

8. The system of claim 6, wherein the real-time manufacturing data comprises testing data of first product.

9. The method of claim 6, wherein the real-time manufacturing data comprises first product part rejection data.

10. The method of claim 6, wherein the real-time manufacturing data is stored in a manufacturing database.

11. A method, comprising:
   importing real-time manufacturing data for a first product into a design-for-manufacturing software module;
   importing design data for a second product into the design-for-manufacturing software module;
   comparing the real-time manufacturing data to the design data; and
   flagging an overlapping element of the real-time manufacturing data and the design data, wherein the overlapping element meets a variance criteria, wherein the overlapping element comprises an identification tag of a first product part, wherein the first product part is incorporated into the first product, and wherein the identification tag of the product part is present in the design data for the second product.

12. The method of claim 11, further comprising notifying a user of the overlapping element.

13. The method of claim 11, wherein the real-time manufacturing data comprises testing data of first product.

14. The method of claim 11, wherein the real-time manufacturing data comprises first product part rejection data.

15. The method of claim 11, further comprising storing the real-time manufacturing data in a manufacturing database.

16. A computer-readable medium containing computer instructions for instructing a processor to perform a method of design for manufacturing, the instructions comprising:
   importing real-time manufacturing data for a first product into a design-for-manufacturing software module;
   importing design data for a second product into the design-for-manufacturing software module;
   comparing the real-time manufacturing data to the design data; and
   flagging an overlapping element of the real-time manufacturing data and the design data, wherein the overlapping element meets a variance criteria, wherein the overlapping element comprises an identification tag of a first product part, wherein the first product part is incorporated into the first product, and wherein the identification tag of the first product part is present in the design data for the second product.

17. The computer-readable medium of claim 16, further comprising notifying a user of the overlapping element.

18. The computer-readable medium of claim 16, wherein the real-time manufacturing data comprises testing data of first product.

19. The computer-readable medium of claim 16, wherein the real-time manufacturing data comprises first product part rejection data.

20. The computer-readable medium of claim 16, further comprising storing the real-time manufacturing data in a manufacturing database.

* * * * *